United States Patent [19]

Walles et al.

[11] Patent Number: 5,216,114
[45] Date of Patent: Jun. 1, 1993

[54] SULFONATION OF POLYBENZOXAZOLE AND POLYBENZOTHIAZOLE FOR IMPROVED ADHESION TO MATRIX RESINS

[75] Inventors: William E. Walles; Robert M. Nowak, both of Midland, Mich.

[73] Assignee: The Dow Chemical Company, Midland, Mich.

[21] Appl. No.: 657,572

[22] Filed: Feb. 19, 1991

[51] Int. Cl.[5] ............ C08G 75/00; C08G 63/00; C08F 6/00
[52] U.S. Cl. ............ 528/173; 528/179; 528/183; 528/337; 528/342; 528/487
[58] Field of Search ............ 528/173, 179, 183, 337, 528/342, 487

[56] References Cited

U.S. PATENT DOCUMENTS

| | | | |
|---|---|---|---|
| 2,578,063 | 12/1951 | Hackmann | 264/184 |
| 3,556,895 | 1/1971 | Mallone et al. | 264/83 |
| 3,617,338 | 11/1971 | Caloia et al. | 427/210 |
| 4,051,108 | 9/1977 | Helminiak et al. | 528/183 |
| 4,101,514 | 7/1978 | Thom | 528/109 |
| 4,263,245 | 4/1981 | Tan | 264/184 |
| 4,487,735 | 12/1984 | Chenevey et al. | 528/183 |
| 4,533,693 | 8/1985 | Wolfe et al. | 528/183 |
| 4,591,437 | 4/1986 | Mammone | 210/265 |
| 4,606,875 | 8/1986 | Chenevey et al. | 528/183 |
| 4,628,067 | 12/1986 | Chen, Sr. et al. | 528/491 |
| 4,634,530 | 1/1987 | Kuder et al. | 210/500 |
| 4,663,142 | 5/1987 | Cameron et al. | 423/532 |
| 4,673,560 | 6/1987 | Masse et al. | 423/532 |
| 4,772,678 | 9/1988 | Sybert et al. | 528/337 |
| 4,814,399 | 3/1989 | Sansone et al. | 525/435 |
| 4,826,502 | 5/1989 | Sansone et al. | 8/115.59 |
| 4,847,350 | 7/1989 | Harris | 528/183 |
| 4,861,250 | 8/1989 | Walles et al. | 425/90 |
| 4,868,008 | 9/1989 | Marikar et al. | 427/126.1 |
| 4,898,924 | 2/1990 | Chenevey | 528/337 |
| 4,902,493 | 2/1990 | Walles et al. | 423/522 |
| 4,912,176 | 3/1990 | Alvarez et al. | 525/435 |
| 4,915,912 | 4/1990 | Walles et al. | 423/522 |
| 5,086,120 | 2/1992 | Tan et al. | 525/183 |

OTHER PUBLICATIONS

Lawrence T. Drzal, et al., "Adhesion of Graphite Fibers to Epoxy Matrices: I. The Role of Fiber Surface Treatment," *Journal of Adhesion*, 1982, vol. 16, pp. 1–30.

*Primary Examiner*—John Kight, III
*Assistant Examiner*—T. Mosley

[57] ABSTRACT

A method for sulfonating items comprising polybenzazole polymers is described. These sulfonated polybenzazole items are incorporated into composites containing a matrix resin such as an epoxy resin. The interfacial shear strength of these sulfonated polybenzazole fiber-containing composites is significantly improved over the interfacial shear strength of similar composites containing unsulfonated polybenzazole fibers.

19 Claims, No Drawings

SULFONATION OF POLYBENZOXAZOLE AND POLYBENZOTHIAZOLE FOR IMPROVED ADHESION TO MATRIX RESINS

BACKGROUND OF THE INVENTION

This invention relates to substituted polybenzazole polymers in various physical forms, such as fibers or films, and shaped articles such as matrix composites and laminates containing these polybenzazole polymers.

Matrix composites, also known as fiber-reinforced composites, are shaped articles comprising a plurality of fibers (the reinforcement) embedded in a plastic (the matrix). Typically, the fibers give strength and/or stiffness to the composite, and the matrix maintains fiber alignment and transfers load around broken fibers. The mechanical properties of these matrix composites are known to depend upon how well the reinforcing fibers adhere to the matrix resin. Therefore, it is desirable to maximize the adhesion between the fibers and the matrix resin.

Multilayer laminates are articles comprising multiple layers of films and other materials adhered together by various adhesives and/or other sealing techniques. Each layer in a laminate contributes a property, such as structural stability or moisture barrier, to the completed laminate. For a laminate to function as designed it is important that all of the layers of the laminate remain adhered to each other throughout the working life of the laminate. Therefore, it is desirable to maximize the adhesion between the layers of a multilayer laminate.

Matrix composites containing polybenzazole fibers have been prepared, and the use of polybenzazole films in multilayer laminates has been investigated, therefore it would be desirable to improve the adhesion of the polybenzazole fibers to the matrix resin in a matrix composite and to improve the adhesion of the polybenzazole film to the other layers in a multilayer laminate.

SUMMARY OF THE INVENTION

The first aspect of this invention is a process to sulfonate fibers or films or other various items, containing polybenzoxazole and/or polybenzothiazole. This process comprises contacting the fiber or film or other item with a sulfonating agent, which is sulfur trioxide or any compound which produces sulfur trioxide in situ.

The second aspect of this invention is the sulfonated polybenzoxazole or polybenzothiazole polymer item itself.

The third aspect of this invention is a composite comprising:
(1) a sulfonated fiber of polybenzoxazole and/ or polybenzothiazole, and
(2) a matrix resin. The fourth aspect of this invention is a laminate comprising:
(1) a sulfonated film of polybenzoxazole and/or polybenzothiazole, and
(2) other laminae, including at least one layer of
(2) a resin or adhesive.

The matrix composites which include sulfonated polybenzazole fibers have increased interfacial shear strength over those matrix composites made with unsulfonated polybenzazole fibers. It is also believed that sulfonated polybenzazole films would adhere better to the other layers of a multi-layer laminate than would an unsulfonated polybenzazole film.

DETAILED DESCRIPTION OF THE INVENTION

The present invention uses shaped articles containing polybenzazole (polybenzoxazole and polybenzothiazole) polymers. Polybenzoxazole, polybenzothiazole and random, sequential and block copolymers of polybenzoxazole and polybenzothiazole are described in references such as Wolfe et al., Liquid Crystalline Polymer Compositions, Process and Products, U.S. Patent 4,703,103 (October 27, 1987): Wolfe et al., Liquid Crystalline Polymer Compositions, Process and Products, U.S. Pat. No. 4,533,692 (Aug. 6, 1985): Wolfe et al., Liquid Crystalline Poly(2,6-Benzothiazole) Compositions, Process and Products, U.S. Pat. No. 4,533,724 (Aug. 6, 1985): Wolfe, Liquid Crystalline Polymer Compositions. Process and Products. U.S. Pat. No. 4,533,693 (Aug. 6, 1985): Evers, Thermoxadatively Stable Articulated p-Benzobisoxazole and p-Benzobisthiazole Polymers, U.S. Pat. No. 4,359,567 (Nov. 16, 1982): Tsai et al., Method for Making Heterocyclic Block Copolymer. U.S. Pat. No. 4,578,432 (Mar. 25, 1986): 11 Ency. Poly. Sci. & Eng., Polybenzothiazoles and Polybenzoxazoles, 601 (J. Wiley & Sons 1988) and W. W. Adams et al., The Materials Science and Engineering of Rigid-Rod Polymers (Materials Research Society 1989), which are incorporated herein by reference.

The polymer may contain AB-mer units, as represented in Formula 1(a), and/or AA/BB-mer units, as represented in Formula 1(b)

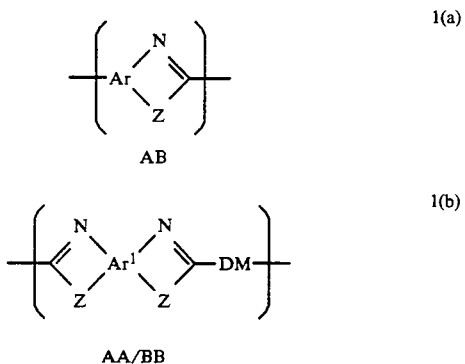

wherein:

Each Ar represents an aromatic group. The aromatic group may be heterocyclic, such as a pyridinylene group, but it is preferably carbocyclic. The aromatic group may be a fused or unfused polycyclic system, but is preferably a single six-membered ring. Size is not critical, but the aromatic group preferably contains no more than about 18 carbon atoms, more preferably no more than about 12 carbon atoms and most preferably no more than about 6 carbon atoms. Examples of suitable aromatic groups include phenylene moieties, tolylene moieties, biphenylene moieties and bis-phenylene ether moieties. $Ar^1$ in AA/BB-mer units is preferably a 1,2,4,5-phenylene moiety or an analog thereof. Ar in AB-mer units is preferably a 1,3,4-phenylene moiety or an analog thereof.

Each Z is independently an oxygen or a sulfur atom.

Each DM is independently a bond or a divalent organic moiety that does not interfere with the synthesis, fabrication or use of the polymer. The divalent organic moiety may contain an aliphatic group, which preferably has no more than about 12 carbon atoms, but the divalent organic moiety is preferably an aromatic group (Ar) as previously described. It is most preferably a 1,4-phenylene moiety or an analog thereof.

The nitrogen atom and the Z moiety in each azole ring are bonded to adjacent carbon atoms in the aromatic group, such that a five-membered azole ring fused with the aromatic group is formed.

The azole rings in AA/BB-mer units may be in cis- or trans-position with respect to each other, as illustrated in 11 Ency. Poly. Sci. & Eng., supra. at 602, which is incorporated herein b reference.

The polymer preferably consists essentially of either AB-polybenzazole mer units or AA/BB-polybenzazole mer units, and more preferably consists essentially of AA/BB-polybenzazole mer units. The molecular structure of the polybenzazole polymer may be rigid rod, semi-rigid rod or flexible coil. It is preferably rigid rod the case of an AA/BB-polybenzazole polymer or semi-rigid in the case of an AB-polybenzazole polymer. Azole rings within the polymer are preferably oxazole rings (Z =O). Preferred mer units are illustrated in Formulae 2 (a)–(h) The polymer more preferably consists essentially of mer units selected from those illustrated in 2(a)–(h), and most preferably consists essentially of a number of identical units selected from those illustrated in 2(a)–(c).

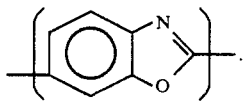

AB—PBO
Poly(2,6-benzoxazole)

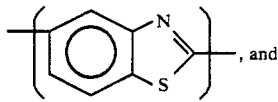

Poly(2,5-benzothiazole)

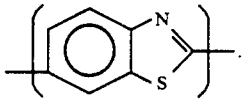

Poly(2,6-benzothiazole)

Each polymer preferably contains on average at least about 25 mer units, more preferably at least about 50 mer units and most preferably at least about 100 mer units. The inherent viscosity of rigid AA/BB-polybenzazole polymers in methanesulfonic acid at 25° C. is preferably at least about 10 deciliters/gram ("dL/g"), more preferably at least about 15 dL/g, and most preferably at least about 20 dL/g. For some purposes, an inherent viscosity of at least about 25 dL/g or 30 dL/g may be best. Inherent viscosity of 60 dL/g or higher is possible, but the inherent viscosity is preferably no more than about 40 dL/g. The inherent viscosity of semi-rigid AB-polybenzazole polymers is preferably at least about 5 dL/g, more preferably at

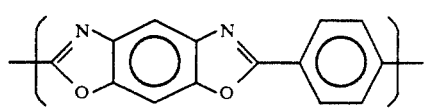

cis-polybenzoxazole
Poly[benzo(1,2-d:5,4-d')bisoxazole-2,6-diyl-1,4-phenylene]

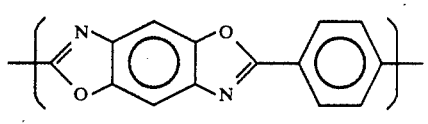

trans-polybenzoxazole
Poly[benzo(1,2-d:4,5-d')bisoxazole-2,6-diyl-1,4-phenylene]

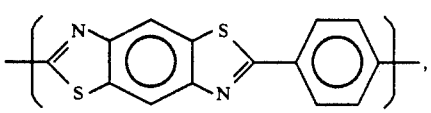

trans-polybenzothiazole

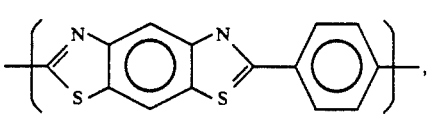

cis-polybenzothiazole

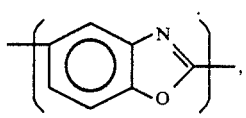

AB—PBO
Poly(2,5-benzoxazole)

least about 10 dL/g and most preferably at least about 15 dL/g.

The polymer is fabricated into fibers and films by spinning or extruding from a dope. If freshly made polymer or copolymer is not available for spinning or extruding, then previously made polymer or copolymer can be dissolved in a solvent to form a solution or dope. Some polybenzoxazole and polybenzothiazole polymers are soluble in cresol, but the solvent is preferably an acid capable of dissolving the polymer. The acid is preferably non-oxidizing. Examples of suitable acids include polyphosphoric acid, methanesulfonic acid and sulfuric acid and mixtures of those acids. The acid is preferably polyphosphoric acid and/or methanesulfonic acid, and is more preferably polyphosphoric acid.

The dope should contain a high enough concentration of polymer for the polymer to coagulate to form a solid article but not such a high concentration that the viscosity of the dope is unmanageable to handle. When the polymer is rigid or semi-rigid, then the concentration of polymer in the dope is preferably high enough to provide a liquid crystalline dope. The concentration of the polymer is preferably at least about 7 weight percent, more preferably at least about 10 weight percent and most preferably at least about 14 weight percent. The maximum concentration is limited primarily by practical factors, such as polymer solubility and, as already described, dope viscosity. Because of these limiting factors, the concentration of polymer is seldom more than 30 weight percent, and usually no more than about 20 weight percent.

Suitable polymers or copolymers and dopes can be synthesized by known procedures, such as those described in Wolfe et al., U.S. Pat. No. 4,533,693 (Aug. 6, 1985): Sybert et al., U.S. Pat. No. 4,772,678 (Sep. 20, 1988): Harris, U.S. Pat. No. 4,847,350 (July 11, 1989): and Ledbetter et al., "An Integrated Laboratory Process for Preparing Rigid Rod Fibers from the Monomers," The Materials Science and Engineering of Rigid-Rod Polymers at 253-64 (Materials Res. Soc. 1989), which are incorporated herein by reference. In summary, suitable monomers (AA-monomers and BB-monomers or AB-monomers) are reacted in a solution of nonoxidizing and dehydrating acid under nonoxidizing atmosphere with vigorous mixing and high shear at a temperature that is increased in step-wise or ramped fashion from a starting temperature of no more than about 120° C. to a final temperature of at least about 190° C. Examples of suitable AA-monomers include terephthalic acid and analogs thereof. Examples of suitable BB-monomers include 4,6-diaminoresorcinol, 2,5-diaminohydroquinone, 2,5-diamino-1,4-dithiobenzene and analogs thereof, typically stored as acid salts. Examples of suitable AB-monomers include 3-amino-4-hydroxybenzoic acid, 3-hydroxy-4-aminobenzoic acid, 3-amino-4-thiobenzoic acid, 3-thio-4-aminobenzoic acid and analogs thereof, typically stored as acid salts.

B. Shape Formation

Acid dopes of polybenzazole polymers are coagulated to form various useful items.

1. Fiber

A fiber can be formed by dry-jet wet spinning the polybenzazoledope. In this method, conventional equipment is used to extrude the fiber through an air gap into a coagulating bath. The extrudate is then stretched by winding the fiber at a linear speed greater than the speed at which it leaves the spinneret jet. The spin-draw ratio can be as high as 20:1. The technique for spinning such a fiber is well-known and is described in such references as U.S. Pat. Nos. 4,263,245 and 4,606,875 and in Chenevey, "Formation and Properties of Fiber and Film from PBZT," The Materials Science and Engineering of Rigid-Rod Polymers p. 245 (Materials Research Society 1988).

2. Film

Films are formed by a known process involving extrusion of polybenzazole dope through a die, and then through a variable air-gap length into the coagulating bath. The extrusion process may, for example, run through a flat die onto a rotating drum or through a counter rotating die. The polymer dope may be stretched before coagulation to provide mono- or biaxial orientation. Processes for synthesizing films are described in the following references: U.S. Pat. Nos. 4,051,108: 4,487,735; and 4,898,924, and PCT publications WO 89/12072, WO 89/12546 and WO 89/12547, which are incorporated herein by reference. Once created, the films may then be heat-treated under tension to increase their strength. Conventional equipment and techniques are used for this procedure.

C. Sulfonation

Various items of polybenzazole (polybenz-othiazole or polybenzoxazole) polymers can be sulfonated by contact with a sulfonating agent. This process comprises contacting the article with a sulfonating agent which is sulfur trioxide ("S03") or any compound which produces sulfur trioxide in situ. It is also known that $SO_3$ can be complexed with certain Lewis bases, and there are certain organic compounds which release $SO_3$.

There are two methods of contacting the polybenzazole polymer with a sulfonating agent. The first is to immerse the polybenzazole polymer in a liquid which contains a sulfonating agent. The second method is to expose the polybenzazole polymer to a gaseous environment which contains a gaseous sulfonating agent.

A means of contacting the polybenzazole polymer with a liquid sulfonating agent is to expose it to a solution of sulfur trioxide ($SO_3$) in a halocarbon solvent that dissolves the $SO_3$ and causes the polybenzazole polymer to slightly swell without dissolving the polybenzazole polymer. The solvent is preferably a chlorofluorocarbon solvent, such as 1,1,2-trichloro-1,2,2-trifluoroethane (sold under the trademark Freon 113®). This solvent is preferred because the 1,1,2-trichloro-1,2,2-trifluoroethane causes the polybenzazole polymer to slightly swell, which allows for better penetration of the article by the $SO_3$. The 1,1,2-trichloro-1,2,2-trifluoroethane also reduces the reactivity of $SO_3$ so there is much less chance that the $SO_3$ will react so extensively with the polybenzazole polymer as to cause oxidative degradation of the polymer.

The sulfonation process begins when an item, such as a fiber or film, made of polybenzazole is placed in contact with one of the sulfonating agents previously described. The optimal conditions of sulfonation will vary, depending on the polybenzazole polymer and whatever sulfonating agent is used. The optimal temperature for sulfonation is between 5° C. and 200° C. with a preferable range of between 20° C. and 30° C. and the most preferred temperature being ambient room temperature of about 25° C.

In a method of sulfonating the polybenzazole polymer by means of a liquid sulfonating agent, it is effective to use a solution of sulfur trioxide in a liquid that also swells the said polymer. One example of such a "swelling liquid" is the previously described chlorofluorocarbon solvent, trichlorotriflouroethane. The concentration of sulfur trioxide in the solvent can range from about 0.1 percent to about 25 percent by weight, with a preferred concentration being about 8 percent by weight. A conventional bath, as known to be used in liquid sulfonation processes, is used to make contact between the sulfonating agent, swelling compound, and the polybenzoxazole or polybenzothiazole polymer. It is, of course, to be understood that the swelling step and the sulfonation step do not have to be simultaneous as this method describes.

In a liquid medium, the polybenzazole polymer is maintained in contact with the sulfonating agent for a time within the range of 10 seconds to 5 minutes. The preferred contacting time for sulfonating in a liquid medium is about 20 seconds. The sulfonation reaction is essentially instantaneous, however, a longer reaction time increases the sulfonating agent's ability to penetrate the polybenzazole polymer. If the reaction is allowed to proceed longer than the recommended time, then undesirable oxidative degradation of the polymer may take place. Oxidative degradation of the sulfonated polybenzazole polymer is apparent if the article swells and takes on a gelatinous appearance when it is immersed in water.

A method of sulfonating the polybenzazole polymer with a gaseous sulfonating agent is to expose the article to gaseous sulfur trioxide. The gaseous sulfur trioxide is preferably diluted with a dry inert carrier gas such as air, nitrogen, helium, carbon dioxide, sulfur dioxide and the like. When gaseous sulfur trioxide is used as the sulfonating medium, the concentration of the sulfur trioxide in the inert gas should be less than or equal to 20% in order to minimize the heat of reaction. The amount of time required to sulfonate a polybenzazole polymer by using a gaseous sulfonating agent ranges from between about .02 seconds to about 5 hours.

To expose a polybenzazole polymer to a gaseous sulfonating agent involves running a continuous polybenzazole fiber spinning line or film extruding line through a device in which there is a gaseous sulfonating agent present, along with an inert dilution gas. The advantages of using a gaseous sulfonating system include faster reaction times (as little as 0.02 seconds may be required to sulfonate in a gaseous sulfonating medium) and the nonexistence of liquid halocarbon solvent waste to deal with.

U.S. Pat. No's. 4,663,142: 4,673,560 and 4,915,912 disclose apparati suitable for gaseous sulfonation of various materials. These patents are incorporated herein by reference.

In both the liquid and gaseous sulfonation processes, after contact with the sulfonating agent the sulfonated surface of the polybenzazole polymer preferably should be neutralized. This is accomplished by contacting the sulfonated surface or surfaces with a neutralizing agent. Any neutralizing agent capable of neutralizing the sulfonic acid groups of the sulfonated surface is suitable for the purposes of this invention. Advantageous neutralizing agents include dilute aqueous solutions of alkali metal hydroxides or salts thereof and a weak acid: alkaline earth metal hydroxides or salts thereof and a weak acid: heavy metal chlorides or sulfates, primary, secondary or tertiary amines: quaternary ammonium salts: ammonia gas and ammonium hydroxide: and mixtures thereof. Neutralization can be effected by contacting the sulfonated surfaces with the foregoing aqueous solutions or suspensions such as by dipping, spraying or wiping the polybenzazole polymer with the solutions, washing with water and then drying the polymer.

Contact time and sulfonating agent concentration for the sulfonation reaction are inversely related. This means that shorter reaction times are required for higher sulfonating agent concentrations and longer reaction times are required for weaker sulfonating agent concentrations. Therefore, a wide range of sulfonating agent concentrations are usable with this invention and the degree of sulfonation imparted can be controlled with exposure time.

The changes in the polybenzazole article brought about by the sulfonation procedure depend upon the degree of exposure the article experiences. Mild or short exposure is believed to cause a reaction between the $SO_3$ and only the weak outer layers of polybenzazole. Longer exposure is believed to allow deep penetration and the attachment of many sulfonate groups. Prolonged exposure will degrade the polybenzazole. Therefore, the sulfur content of the polybenzazole polymer after sulfonation will range from being barely detectable to being possibly as high as 3 percent of the polymer on a weight basis.

D. Utility of Sulfonated Polybenzoxazole and/or Polybenzothiazole Polymers in Various Physical Forms 1) Composites The sulfonated polybenzazole polymers obtained from this invention can be used to reinforce a variety of thermosetting and thermoplastic polymer matrix materials. Epoxy resin is the preferred matrix material for these composite applications but unsaturated polyesters, polyurethanes, polycyanates, rubbers, polyamides, and polyesters can also be used. The resulting matrix composite, reinforced with sulfonated polybenzoxazole or polybenzothiazole polymers in fiber form, preferably attains a higher interfacial shear strength than do composites made with unsulfonated fibers. The improvement in interfacial shear strength attained is preferably at least 25 percent, more preferably at least 50 percent, and most preferably at least 75 percent. These reinforced composites find application for use as structural members in structures requiring a high ratio of strength to weight such as are required in transportation vehicles or equipment.

2) Enhanced Polarity

The sulfonate functionality adds polarity to polybenzoxazole or polybenzothiazole, and in so doing, adds polar stability for the polymer's ion related uses. An attached sulfonate group adds an anionic site. The sulfonated polybenzoxazole or polybenzothiazole is electrically conductive and will conduct a static charge. Additionally, the anionic site offers a change in the surface tension characteristic from unsulfonated polybenzoxazole and polybenzothiazole. Because of this change of surface tension characteristic, when sulfonated polybenzoxazole or polybenzothiazole is mixed with an ionic medium like a latex, a more stable mixture can be obtained over that which can be obtained using unsulfonated polybenzoxazole or polybenzothiazole. Also, because of this change in surface tension characteristic, the sulfonated polymer has greater wettability. Therefore, a highly polar solvent, like water, is more easily retained on the surface of the sulfonated polymer.

Illustrative Embodiment

The following example is given to illustrate the invention and should not be interpreted as limiting it in any way. Unless stated otherwise, all parts and percentages are given by weight.

EXAMPLE

Polybenzoxazole is sulfonated by sulfur trioxide by adding 0.477 grams of polybenzoxazole fibers to a 4.0 ounce bottle containing a solution of 0.8 percent sulfur trioxide in 1,1,2-trichloro-1,2,2-trifluoroethane. The fibers are allowed to react for 20 seconds and then the solution is drained off. After draining off the sulfur trioxide solution the fibers are washed with 2.0 percent ammonia in water to neutralize the sample. After this neutralization, the fibers are washed twice with fresh water and then allowed to dry. The sulfur content of this sulfonated polybenzoxazole is approximately 0.08 percent by weight.

A composite is made containing the so-treated fibers. Twenty-two (22.0) grams of Tactix 123 ® epoxy resin (an epoxy resin with an epoxy equivalent weight of 173, sold by The Dow Chemical Company), are placed in a 50 ml beaker. Three and forty four hundredths (3.44) grams of meta-phenylene diamine, equivalent weight of 27.04 grams, is placed in a second 50 ml beaker. Both beakers are placed in an air oven and heated to 70° C. The two materials are then combined by first pouring the meta-phenylene diamine into the epoxy and then stirring well. This mixture is then poured into the beaker containing the residual metaphenylene diamine and stirred. The mixture is degassed in a vacuum oven at 70° C.

Next, the sulfonated polybenzoxazole fibers are placed evenly in a multi-cavity dog-bone mold. The mold containing the fibers is placed in a vacuum oven at 70° C. for 30 minutes. When the epoxy resin reaches 70° C. in temperature, the epoxy resin mixture is poured into the mold containing the fibers. The mold is then placed in an air oven, and the epoxy resin is cured at 75° C. for two hours, then the oven temperature is increased to 125° C. for two hours. After this, the oven is turned off and the coupon is allowed to cool to room temperature. Then the cured epoxy resin containing the polybenzoxazole is removed from the mold. By following this procedure, coupons containing sulfonated polybenzoxazole fibers reinforcing an epoxy resin are obtained.

As stated previously the interfacial shear strength of the fiber containing composite matrix can be tested by an "embedded single filament shear strength method" as described in Drzal et al., *Adhesion of Graphite Fibers to Epoxy Matrixes: I. The Role of Fiber Surface Treatment*, 16 J. Adhesion 1-30 (1982).

This method is briefly described as follows: a single fiber is axially aligned and embedded in a polymeric matrix dog-bone coupon. The coupon is incrementally strained causing the embedded fiber to fracture into smaller and smaller fragments. Strain is increased until no more fiber fracture occurs. From analysis of the fiber fragment lengths, fiber diameter, and fiber tensile strength the interfacial shear strength can be calculated.

The coupons prepared by the above-described method have an interfacial shear strength of above 17.9 Mpa (2,593 psi). Coupons similarly prepared and tested but containing unsulfonated polybenzoxazole fibers have an interfacial shear strength of 10.1 MPa(1,466 psi). Thus, surface sulfonation of the polybenzoxazole fibers used in a matrix composite has been shown to increase the interfacial shear strength of the composite by 74%.

What is claimed is:

1. A sulfonated polybenzazole polymer or copolymer.

2. The polymer or copolymer of claim 1 wherein said sulfonated polybenzazole polymer or copolymer is sulfonated cis-polybenzoxazole.

3. The polymer or copolymer of claim 1 wherein said sulfonated polybenzazole polymer or copolymer is sulfonated AB-polybenzoxazole.

4. The polymer or copolymer of claim 1 wherein said sulfonated polybenzazole polymer or copolymer is sulfonated polybenzothiazole.

5. The polymer or copolymer of claim 1 wherein said sulfonated polybenzazole polymer or copolymer is sulfonated trans-polybenzothiazole.

6. The polymer or copolymer of claim 1, which is in the form of a fiber.

7. The polymer or copolymer of claim 1, which is in the form of a film.

8. A process for sulfonating an item of polybenzazole comprising the step of contacting said item with a sulfonating agent which is sulfur trioxide or any compound which produces sulfur trioxide in situ under conditions such that said item exhibits measurably improved adhesive properties as measured by determining the interfacial shear strength of composites or laminates containing said item.

9. The process of claim 8 wherein said sulfonating agent is sulfur trioxide.

10. The process of claim 8 wherein said sulfonating agent comprises a mixture of gaseous sulfur trioxide in a dry, inert carrier gas.

11. The process of claim 10 wherein said mixture of gaseous sulfur trioxide in an inert carrier gas contains 20 percent or less sulfur trioxide.

12. The process of claim 11 wherein said sulfonating agent contacts said item of polybenzazole for between about 0.02 seconds to about 5 hours at a temperature between about 5° C. to about 100° C.

13. The process of claim 8 wherein said sulfonating agent comprises a mixture of sulfur trioxide in a liquid halocarbon solvent.

14. The process of claim 13 wherein said liquid halocarbon solvent is a chlorofluorocarbon solvent.

15. The process of claim 14 wherein said liquid halocarbon solvent is 1,1,2-trichloro-1,2,2-trifluoroethane.

16. The process of claim 15 wherein said item is contacted with said sulfonating agent at a temperature of between about 5° C. to about 100° C. for between about 10 seconds to about 5 minutes.

17. The process of claim 15 wherein said item is contacted with said sulfonating agent at a temperature of about 10° C. to about 30° C. for between about 10 seconds to about 2 minutes.

18. The process of claim 15 wherein said item is contacted with said sulfonating agent at a temperature of about 25° C.

19. The process of claim 15 wherein said item is contacted with said sulfonating agent for about 20 seconds.

* * * * *